United States Patent
Yamamoto et al.

(10) Patent No.: US 9,868,669 B2
(45) Date of Patent: Jan. 16, 2018

(54) PRECIOUS METAL CLAY REGENERATION SOLUTION AND METHOD FOR REGENERATING PRECIOUS METAL CLAY

(71) Applicant: MITSUBISHI MATERIALS CORPORATION, Tokyo (JP)

(72) Inventors: Yoshifumi Yamamoto, Sanda (JP); Yasuo Ido, Sanda (JP); Tsukasa Ikeda, Sanda (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/271,532

(22) Filed: Sep. 21, 2016

(65) Prior Publication Data

US 2017/0088468 A1 Mar. 30, 2017

(30) Foreign Application Priority Data

Sep. 25, 2015 (JP) ................................. 2015-187829
Sep. 2, 2016 (JP) ................................. 2016-171740

(51) Int. Cl.
- *E03C 1/28* (2006.01)
- *C04B 33/04* (2006.01)
- *A44C 27/00* (2006.01)

(52) U.S. Cl.
CPC ............ *C04B 33/04* (2013.01); *A44C 27/002* (2013.01); *C04B 2235/3291* (2013.01); *C04B 2235/349* (2013.01); *C04B 2235/40* (2013.01)

(58) Field of Classification Search
CPC ....... E03C 1/28; E03C 1/281; Y10T 137/0318
See application file for complete search history.

(56) References Cited

U.S. PATENT DOCUMENTS

| 4,790,989 A * | 12/1988 | Hunter | A61K 31/35 424/404 |
| 5,594,026 A * | 1/1997 | Greenway | C07D 407/06 514/460 |
| 2011/0162720 A1* | 7/2011 | Ueno | E03C 1/28 137/1 |

FOREIGN PATENT DOCUMENTS

| CN | 102516781 A | 6/2012 |
| CN | 102677471 A | 9/2012 |
| CN | 104178099 A | 12/2014 |
| CN | 104419395 A | 3/2015 |
| GB | 888180 A | 1/1962 |
| JP | 2005-187858 A | 7/2005 |

(Continued)

OTHER PUBLICATIONS

Search Report dated Mar. 13, 2017, issued for the GB Application No. 1616117.6.

(Continued)

*Primary Examiner* — Noah Wiese
(74) *Attorney, Agent, or Firm* — Locke Lord LLP

(57) ABSTRACT

A precious metal clay regeneration solution contains water and a liquid paraffin, in which an amount of the liquid paraffin is more than or equal to 0.12 parts by mass and less than or equal to 60 parts by mass with respect to 100 parts by mass of the water. A method for regenerating precious metal clay includes a step of bringing water and a liquid paraffin into contact with a solidified precious metal clay, in which an amount of the liquid paraffin is more than or equal to 0.12 parts by mass and less than or equal to 60 parts by mass with respect to 100 parts by mass of the water.

2 Claims, 2 Drawing Sheets

(56) References Cited

FOREIGN PATENT DOCUMENTS

JP         4265127 B2    5/2009

OTHER PUBLICATIONS

"Mineral oil", Wikipedia, Sep. 4, 2017, [online], Available from <https://en.wikipedia.org/wiki/Mineral_oil>, 4 pages.
"Icosane", Wikipedia, Sep. 1, 2017, [online], Available from <https://en.wikipedia.org/wiki/Icosane>, 3 pages.
"Paraffin wax", Wikipedia, Jul. 24, 2015, [online], Available from https://zh.wikipedia.org/wiki/%E7%9F%B3%E8%9C%A1 <https://zh.wikipedia.org/wiki/%E7%9F%B3%E8%9C%A1>, 7 pages.
Office Action dated Sep. 5, 2017, issued for GB1616117.6.

\* cited by examiner

PRECIOUS METAL CLAY REGENERATION SOLUTION AND METHOD FOR REGENERATING PRECIOUS METAL CLAY

BACKGROUND OF THE INVENTION

Field of the Invention

The present invention relates to a precious metal clay regeneration solution and a method for regenerating a precious metal clay.

Priority is claimed on Japanese Patent Application No. 2015-187829, filed Sep. 25, 2015 and Japanese Patent Application No. 2016-171740, filed Sep. 2, 2016, the contents of which are incorporated herein by reference.

Description of Related Art

A precious metal clay is known as a clay-like composition containing fine precious metal powders. Precious metal crafts can be obtained by forming a precious metal clay containing fine precious metal powders into a shaped body with a desired arbitrary shape, drying the shaped body, and then sintering the fine precious metal powders by firing the shaped body. Since the precious metal clays can be used to freely shaped forms in the same manner as typical clay work by hand, the precious metal clays has an advantage that freely shaped precious metal crafts can be produced extremely easily. As a result, the precious metal clay extensively used as a material for accessories such as rings, pendant heads, and the like, and for fine arts and crafts.

Conventionally, the precious metal clay is a composition containing fine precious metal powders, an organic binder, and water as a base constituent. Patent Documents 1 discloses a silver clay consisting of silver fine powders, an organic binder, a fatty substance, a surface active agent, and a balance composed of water.

CITATION LIST

Patent Documents

Patent Document 1: Japanese Patent No. 4,265,127

SUMMARY OF THE INVENTION

Problems to be Solved by the Invention

A shaping of the precious metal clay is mainly performed by hand, but the precious metal clay is dried by a heat transferred from the hand while at work, and the precious metal clay sometimes solidifies. Further, when remaining unused precious metal clay is stored for a long period of time, the precious metal clay is gradually dried, and as a result sometimes solidifies.

As a method for regenerating a solidified precious metal clay and obtaining a precious metal clay having an original clayish state which can be shaped forms, a method in which the solidified precious metal clay is in contact with water and rekneaded is proposed. However, since a precious metal used for the precious metal clay has a shape of fine powders, the solidified precious metal clay is densified, and water penetrates into inside of the solidified precious metal clay poorly. Therefore, when the solidified precious metal clay is in contact with water alone, the precious metal clay is soluble and dispersed in water remaining on a surface of the solidified precious metal clay, and a viscid paste tend to be formed. The viscid paste has a high adhesion property and tends to adhere to a hand. As a result, the precious metal clay containing the viscid paste is difficult to shape into forms.

The present invention has been developed in light of these circumstances. The present invention has an object of providing a precious metal clay regeneration solution and a method for regenerating precious metal clay, in which a solidified precious metal clay is able to regenerate without forming a viscid paste and obtain a precious metal clay having an clayish state which can be shaped forms.

Means for Solving the Problems

In order to achieve the above object, a precious metal clay regeneration solution contains water and a liquid paraffin, wherein the amount of the liquid paraffin is more than or equal to 0.12 parts by mass and less than or equal to 60 parts by mass with respect to 100 parts by mass of the water.

In the precious metal clay regeneration solution having the above-described composition, the precious metal clay regeneration solution which contains more than or equal to 0.12 parts by mass and less than or equal to 60 parts by mass of the liquid paraffin with respect to 100 parts by mass of the water. Therefore, the precious metal clay regeneration solution is likely to penetrate into inside of a solidified precious metal clay. As a result, when the precious metal clay regeneration solution is in contact with the solidified precious metal clay, a formation of a viscid paste is suppressed, the precious metal clay regeneration solution can penetrate into inside of the solidified precious metal clay, and the solidified precious metal clay can be regenerated into a precious metal clay having a clayish state which can be shaped forms.

The above-described precious metal clay regeneration solution preferably contains more than or equal to 5 mass % and less than or equal to 50 mass % of lower alcohols with respect to a total amount of the precious metal clay regeneration solution. When the precious metal clay regeneration solution has the above-described composition, a phase separation between the liquid paraffin and the water in the precious metal clay regeneration solution is suppressed, and the phase state of the precious metal clay regeneration solution is maintained homogeneously for a long period of time.

The above-described precious metal clay regeneration solution preferably contains more than or equal to 0.1 mass % and less than or equal to 30 mass % of surface active agents with respect to a total amount of the precious metal clay regeneration solution. When the precious metal clay regeneration solution has the above-described composition, a phase separation between the liquid paraffin and the water in the precious metal clay regeneration solution is suppressed, and the phase state of the precious metal clay regeneration solution is maintained homogeneously for a long period of time.

In the present invention, a method for regenerating precious metal clay includes a step of bringing water and a liquid paraffin into contact with a solidified precious metal clay, wherein an amount of the liquid paraffin is more than or equal to 0.12 parts by mass and less than or equal to 60 parts by mass with respect to 100 parts by mass of the water.

In the method for regenerating precious metal clay having the above-described step, the water and the liquid paraffin is comes into contact with the solidified precious metal clay in a rate of the liquid paraffin is more than or equal to 0.12 parts by mass and less than or equal to 60 parts by mass with respect to 100 parts by mass of the water. Therefore, the water and the liquid paraffin are likely to penetrate into inside of a solidified precious metal clay. As a result, by using the method for regenerating precious metal clay having the above-described step, a formation of a viscid paste is suppressed, the water and the liquid paraffin can penetrate into inside of the solidified precious metal clay, and the solidified precious metal clay can be regenerated into a precious metal clay having a clayish state which can be shaped forms.

Effects of the Invention

According to the present invention, it is possible to provide a precious metal clay regeneration solution and a method for regenerating precious metal clay, in which a solidified precious metal clay is able to regenerate without forming a viscid paste and obtain a precious metal clay having an clayish state which can be shaped forms.

DETAILED DESCRIPTION OF THE INVENTION

Figure 1:
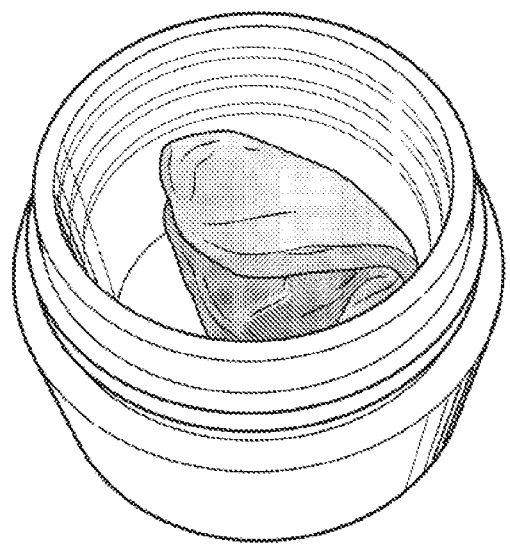
FIG. 1 is an appearance photograph of a regenerated silver clay regenerated by bringing a mixed solution in Example 1 into contact with a solidified precious metal clay.

A precious metal clay regeneration solution of an embodiment contains water and a liquid paraffin, in which the amount of the liquid paraffin is more than or equal to 0.12 parts by mass and less than or equal to 60 parts by mass with respect to 100 parts by mass of the water. The amount of the liquid paraffin is preferably more than or equal to 0.5 parts by mass and less than or equal to 15 parts by mass with respect to 100 parts by mass of the water. If the amount of the liquid paraffin is too little, a viscid paste tends to be formed, while the precious metal clay regeneration solution is in contact with a solidified precious metal clay. If the amount of the liquid paraffin is too much, the precious metal clay regeneration solution is hard to penetrate into inside of the solidified precious metal clay. As a result, it is difficult to regenerate the solidified precious metal clay as a precious metal clay having a clayish state which can be shaped forms.

The liquid paraffin is a mixture of a chain saturated hydrocarbon. The chain saturated hydrocarbon contained in the liquid paraffin generally has 20 or more of carbon atoms. The chain saturated hydrocarbon contained in the liquid paraffin may be a straight chain compound or a branched-chain compound. Both a light liquid paraffin and a heavy liquid paraffin may be used as the liquid paraffin. The amount of the liquid paraffin with respect to the total amount of the precious metal clay regeneration solution is preferably in a range of more than or equal to 0.1 mass % and less than or equal to 30 mass %, more preferably in a range of more than or equal to 0.5 mass % and less than or equal to 10 mass %. The amount of the liquid paraffin in the precious metal clay regeneration solution may be measured by gas chromatography.

In the precious metal clay regeneration solution, the water and the liquid paraffin may have a phase separated state of a water phase and an oil phase (a liquid paraffin phase) or may form an emulsion. When the precious metal clay regeneration solution is separated into the water phase and the oil phase, the precious metal clay regeneration solution is preferably used after mixing the water phase and the oil phase to uniformly disperse the water phase and the oil phase each other in the precious metal clay regeneration solution.

The precious metal clay regeneration solution of the embodiment preferably contains lower alcohols. The lower alcohols may be monovalent alcohols having 1 to 5 of carbon atoms. Examples of the lower alcohols include methanol, ethanol, 1-propanol, and 2-propanol. The lower alcohols contribute to a emulsion formation of the water and the liquid paraffin. The amount of the lower alcohols with respect to the total amount of the precious metal clay regeneration solution is preferably in a range of more than or equal to 5 mass % and less than or equal to 50 mass %. If the amount of the lower alcohols is too little, an emulsion is hard to be formed from the water and the liquid paraffin, and the precious metal clay regeneration solution tends to be separated into the water phase and the oil phase. If the amount of the lower alcohols is too high, the precious metal clay regeneration solution is hard to penetrate into inside of the solidified precious metal clay. As a result, it is difficult to regenerate the solidified precious metal clay as a precious metal clay having a clayish state which can be shaped forms.

The precious metal clay regeneration solution of the embodiment preferably contains surface active agents. Although there are no particular limitations on the kind of surface active agent, and cationic active agents, anionic active agents, and non-ionic active agents can be used as the surface active agent. The surface active agents contribute to a emulsion formation of the water and the liquid paraffin. The amount of the surface active agents with respect to the total amount of the precious metal clay regeneration solution is preferably in a range of more than or equal to 0.1 mass % and less than or equal to 30 mass %. If the amount of the surface active agents is too little, forming an emulsion from the water and the liquid paraffin is difficult, and the precious metal clay regeneration solution tends to be separated into the water phase and the oil phase. If the amount of the surface active agents is too much, the precious metal clay regeneration solution is hard to penetrate into inside of the solidified precious metal clay. As a result, it is difficult to regenerate the solidified precious metal clay as a precious metal clay having a clayish state which can be shaped forms.

The precious metal clay regeneration solution of the embodiment preferably contains the lower alcohols and the surface active agent within the above described ranges. Further, the precious metal clay regeneration solution of the embodiment may contain an emulsifying agent, a defoaming agent, a viscosity modifier agent, a stabilizer of the liquid paraffin (for example, antioxidant agent), and perfume as additive agents.

A method for regenerating precious metal clay of the embodiment includes a step of bringing the water and the liquid paraffin into contact with the solidified precious metal clay, in which the amount of the liquid paraffin is more than or equal to 0.12 parts by mass and less than or equal to 60 parts by mass with respect to 100 parts by mass of the water. The amount of the liquid paraffin with respect to 100 parts by mass of the water is preferably in a range of more than or equal to 0.5 parts by mass and less than or equal to 15 parts by mass.

The water and the liquid paraffin are preferably in contact with the solidified precious metal clay as the above precious metal clay regeneration solution. When the precious metal clay regeneration solution is in contact with the solidified precious metal clay, the amount of the precious metal clay regeneration solution varies according to a size or a shape of the solidified precious metal clay. That is, although there are no particular limitations on the amount of the precious metal clay regeneration solution, the amount of the precious metal clay regeneration solution is preferably in a range of more than or equal to 0.1 parts by mass and less than or equal to 50 parts by mass, and more preferably in a range of more than or equal to 0.1 parts by mass and less than or equal to 20 parts by mass with respect to 100 parts by mass of the solidified precious metal clay. The precious metal clay regeneration solution is preferably in contact with an entire surface of the solidified precious metal clay.

The solidified precious metal clay which is in contact with the water and the liquid paraffin is preferably left in a closed vessel preventing moisture from vaporize, and then the precious metal clay regeneration solution penetrates into inside of the solidified precious metal clay. The time of the solidified precious metal clay and the precious metal clay regeneration solution are left in the closed vessel may be 30 minutes or more and 24 hours or less. The solidified precious metal clay is plasticized by the precious metal clay regeneration solution penetrates into inside of the solidified precious metal clay. The plasticized solidified precious metal clay is kneaded homogeneously, and then the solidified precious metal clay is regenerated into the precious metal clay having a clayish state which can be shaped forms. The kneading may be performed by using a mortar and pestle or the hand.

In the method for regenerating precious metal clay of the embodiment, the water and the liquid paraffin may be separately in contact with the solidified precious metal clay. When the water and the liquid paraffin are separately in contact with the solidified precious metal clay, the solidified precious metal clay may be in contact with the liquid paraffin after being in contact with the water, or the solidified precious metal clay may be in contact with the water after being in contact with the liquid paraffin. However, when the water and the liquid paraffin are mixed and used as a mixture (the precious metal clay regeneration solution) which is in contact with the solidified precious metal clay, the water and the liquid paraffin easily penetrate into inside of the solidified precious metal clay, as a result, a time for plasticizing the solidified precious metal clay can be shortened.

By the method for regenerating precious metal clay of the embodiment, since the shaping of the precious metal clay regenerated from the solidified precious metal clay can be easily completed by hand, the regenerated precious metal clay can be used as a material of accessories such as rings, pendant heads, and the like and fine arts and crafts.

EXAMPLES

Example 1

The water, the liquid paraffin, ethanol, and the surface active agent were mixed to have compositions shown in Table 1, and mixtures thereof (silver clay regeneration solutions) in Present Invention Examples 1 to 15 and Comparative Examples 1 to 2 were prepared. In Present Invention Examples 1 to 13 and Comparative Examples 1 to 2, a liquid paraffin (manufactured by KISHIDA CHEMICAL Co., Ltd.) was used as the liquid paraffin. In Present Invention Example 14, a liquid paraffin: P-60 (manufactured by MORESCO Corporation) was used as the liquid paraffin. In Present Invention Example 15, a liquid paraffin: HICALL M-352 (manufactured by KANEDA Co., Ltd) was used as the liquid paraffin. In Comparative Example 1, the water was used alone as the silver clay regeneration solution, and in Comparative Example 2, the liquid paraffin (manufactured by KISHIDA CHEMICAL Co., Ltd.) was used alone as the silver clay regeneration solution.

(Amount of Liquid Paraffin with Respect to 100 Parts by Mass of Water)

The amount of liquid paraffin in the silver clay regeneration solution with respect to 100 parts by mass of the water was calculated by the composition of the silver clay regeneration solution. The results were shown in Table 1.

(Presence or Absence of Phase Separation)

In order to evaluate the phase state, whether or not the silver clay regeneration solution was separated into two phases of the water phase and the oil phase (the liquid paraffin phase) was observed. The silver clay regeneration solution, which did not cause the phase separation after exceeding 1 hour from leaving the silver clay regeneration solution in the vessel, was evaluated as "A"; the silver clay regeneration solution, which caused the phase separation after 30 minutes or more and 1 hour or less from leaving the silver clay regeneration solution in the vessel, was evaluated as "B"; the silver clay regeneration solution, which caused the phase separation less than 30 minutes after leaving the silver clay regeneration solution in the vessel, was evaluated as "C". The evaluation results were shown in Table 1.

(Evaluation of Regenerated Silver Clay)

A commercially available silver clay (PMC Flex, manufactured by Mitsubishi Materials Corporation) was prepared and cubes (objects of the silver clay) having 5 mm of depth, 5 mm of width, and 5 mm of height were formed by the silver clay. Next, the objects of the silver clay were heated at a temperature of 80° C. for 24 hours and dried to obtain solidified silver clays.

The solidified silver clays were in contact with the silver clay regeneration solution to regenerate the solidified silver clays. For each of the regenerated silver clays obtained from the solidified silver clays, the formability and the adhesive property were evaluated by the following method. The evaluation results were shown in Table 1.

[Formability]

A 10 g of solidified silver clay was set in a plastic case. Next, a 0.5 g of the silver clay regeneration solution was put in the plastic case little by little to bringing the silver clay regeneration solution into contact with an entire surface of the solidified silver clay. Then, the plastic case was closed by a lid, and the solidified silver clay was left in the closed plastic case for 6 hours at a room temperature. After 6 hours, the plastic case was opened, and the regenerated silver clay was kneaded by hand to evaluate the formability of the regenerated silver clay. When the regenerated silver clay was able to be shaped forms by hand and the viscid paste was not formed, an evaluation of "Excellent" was recorded. When a small amount of the viscid paste was formed, however the regenerated silver clay was able to be shaped forms by hand, an evaluation of "Good" was recorded. When a large amount of the viscid paste was formed, and the regenerated silver clay was hard to be shaped forms by hand, an evaluation of "Fair" was recorded. When the regenerated silver clay was not able to be shaped forms by hand, an evaluation of "Failed" was recorded.

Figure 2:
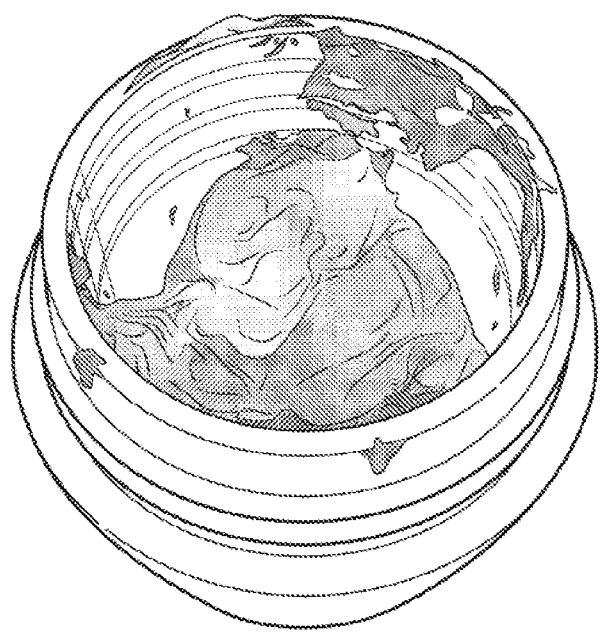
FIG. 2 is an appearance photograph of a regenerated silver clay regenerated by bringing water into contact with a solidified precious metal clay.
Figure 3:
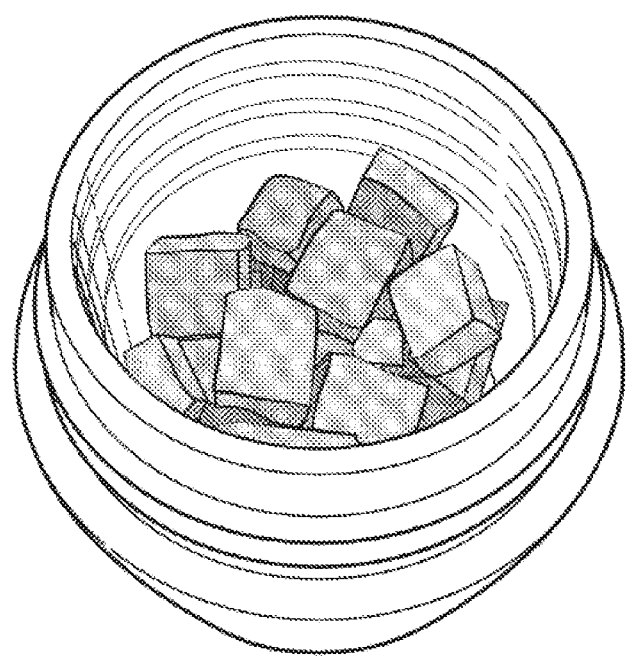
FIG. 3 is an appearance photograph of a regenerated silver clay regenerated by bringing a liquid paraffin into contact with a solidified precious metal clay.

In the cases that the solidified silver clay was in contact with the silver clay regeneration solution of the Present Invention Example 1, the solidified silver clay was in contact with the water of the Reference Example 1, and the solidified silver clay was in contact with the liquid paraffin of the Reference Example 2, the appearance photographs of the regenerated silver clays were taken, after kneading the regenerated silver clay by hand. The appearance photographs were shown in FIGS. 1 to 3. FIG. 1 showed the appearance photograph when the silver clay regeneration solution of the Present Invention Example 1 was used, FIG. 2 showed the appearance photograph when the water (Reference Example 1) was used, FIG. 3 showed the appearance photograph when the liquid paraffin (Reference Example 2) was used.

[Adhesive Property]

A 5 g of solidified silver clay was set in a mortar, and the solidified silver clay was crushed by a pestle to obtain powder of the solidified silver clay. Next, a 0.5 g of the silver clay regeneration solution was put in the mortar, and the powder of the solidified silver clay and the silver clay regeneration solution were mixed by the pestle. The obtained full mixture was sandwiched between two polypropylene films and shaped into a sheet-like form with a thickness of 1 mm by a pressure forming. Then, the polypropylene films were peeled from the mixture, and a total amount of attached mixture on the two polypropylene films was measured. When the total amount of attached mixture is less than 0.3 g, an evaluation of "A" was recorded; when the total amount of attached mixture is more than or equal to 0.3 g and less than 0.5 g, an evaluation of "B" was recorded; and when the total amount of attached mixture is more than 0.5 g, an evaluation of "C" was recorded. When the evaluation of above "Formability" was "failed", the evaluation of "Adhesive property" was not performed.

silver clay, the regenerated silver clay which was able to be shaped forms by hand was hard to be obtained.

In the silver clay regeneration solution of the Comparative Example 1, the amount of the liquid paraffin was small, as a result, the viscid paste was formed in the regenerated silver clay, the regenerated silver clay was hard to be shaped forms by hand, and the regenerated silver clay had a high adhesive property.

In the silver clay regeneration solution of the Comparative Example 2, the amount of the liquid paraffin was large, as a result, the silver clay regeneration solution was not penetrated into inside of the solidified silver clay, the regenerated silver clay which was able to be shaped forms by hand could not be obtained.

The silver clay regeneration solution of the Present Invention Examples 1 to 15 tended to penetrate into the solidified silver clay, and the silver clay regeneration solution penetrated into inside of the solidified silver clay, as a result, the regenerated silver clay was able to be shaped forms by hand, and the regenerated silver clay had a low adhesive property. Furthermore, from the result shown in Table 1, in the Present Invention Examples 1, 5 to 8, 14, and 15, since the amount of the liquid paraffin with respect to 100 parts by mass of the water was in the range of more than or equal to 0.5 parts by mass and less than or equal to 15 parts by mass, the amount of the lower alcohol with respect to a total amount of the silver clay regeneration solution was in the range of more than or equal to 5 mass % and less than or equal to 50 mass

TABLE 1

| | Compositions of silver clay regeneration solution | | | | Amount of liquid paraffin in silver clay regeneration solution with respect to 100 parts by mass of water (parts by mass) | Presence or absence of phase separation | Regenerated silver clay | |
|---|---|---|---|---|---|---|---|---|
| | Water (mass %) | Liquid paraffin (mass %) | Ethanol (mass %)) | Surface active agent (mass %) | | | Formability | Adhesive property |
| Present Invention Example 1 | 83.00 | 2.00 | 14.00 | 1.00 | 2.41 | A | Excellent | A |
| Present Invention Example 2 | 84.89 | 0.11 | 14.00 | 1.00 | 0.13 | A | Good | B |
| Present Invention Example 3 | 84.73 | 0.27 | 14.00 | 1.00 | 0.32 | A | Good | B |
| Present Invention Example 4 | 56.00 | 29.00 | 14.00 | 1.00 | 51.79 | A | Fair | A |
| Present Invention Example 5 | 92.00 | 2.00 | 5.00 | 1.00 | 2.17 | B | Excellent | A |
| Present Invention Example 6 | 48.40 | 1.10 | 49.50 | 1.00 | 2.27 | A | Excellent | A |
| Present Invention Example 7 | 83.00 | 2.90 | 14.00 | 0.10 | 3.49 | B | Excellent | A |
| Present Invention Example 8 | 54.00 | 2.50 | 14.00 | 29.50 | 4.63 | A | Excellent | A |
| Present Invention Example 9 | 80.72 | 14.40 | 4.80 | 0.08 | 17.84 | C | Fair | A |
| Present Invention Example 10 | 88.00 | 11.00 | 0.00 | 1.00 | 12.50 | B | Excellent | A |
| Present Invention Example 11 | 70.00 | 16.00 | 14.00 | 0.00 | 22.86 | B | Fair | A |
| Present Invention Example 12 | 46.00 | 2.00 | 51.00 | 1.00 | 4.35 | A | Fair | A |
| Present Invention Example 13 | 56.00 | 3.00 | 10.00 | 31.00 | 5.36 | A | Fair | A |
| Present Invention Example 14 | 83.00 | 2.00 | 14.00 | 1.00 | 2.41 | A | Excellent | A |
| Present Invention Example 15 | 83.00 | 2.00 | 14.00 | 1.00 | 2.41 | A | Excellent | A |
| Comparative Example 1 | 84.91 | 0.09 | 14.00 | 1.00 | 0.11 | A | Fair | C |
| Comparative Example 2 | 53.00 | 32.00 | 14.00 | 1.00 | 60.38 | A | Failed | — |
| Reference Example 1 | 100 | — | — | — | — | — | Fair | C |
| Reference Example 2 | — | 100 | — | — | — | — | Failed | — |

From the result of the evaluation of the formability and the adhesive property and the appearance photographs of FIG. 2 in the Reference Example 1, when the solidified silver clay was in contact with the water alone, the viscid paste was formed in the regenerated silver clay, the regenerated silver clay was hard to be shaped forms by hand, and the regenerated silver clay had a high adhesive property.

From the result of the evaluation of the formability and the adhesive property and the appearance photographs of FIG. 3 in the Reference Example 2, when the solidified silver clay was in contact with the liquid paraffin alone, the liquid paraffin was not penetrated into inside of the solidified %, the amount of the surface active agent with respect to a total amount of the silver clay regeneration solution was in the range of more than or equal to 0.1 mass % and less than or equal to 30 mass %, the silver clay regeneration solution exhibited excellent formability and low adhesive property in the regenerated silver clay.

Example 2

A 10 g of solidified silver clay was set in a plastic case. Next, a 0.49 g of the water and a 0.01 g of the liquid paraffin were put in the plastic case in this order little by little to bringing the water and the liquid paraffin into contact with an entire surface of the solidified silver clay. Then, the plastic case was closed by a lid, and the solidified silver clay was left in the closed plastic case for 6 hours at a room temperature. After 6 hours, the plastic case was opened, and the regenerated silver clay was kneaded by hand. As a result, the solidified silver clay could be regenerated into the silver clay having a clayish state which can be shaped forms by hand.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A precious metal clay regeneration solution comprising water, a liquid paraffin, lower alcohols, and a surface active agent,
    wherein an amount of the liquid paraffin is more than or equal to 0.12 parts by mass and less than or equal to 60 parts by mass with respect to 100 parts by mass of the water,
    wherein an amount of the lower alcohols is more than or equal to 5 mass % and less than or equal to 50 mass % with respect to a total amount of the precious metal clay regeneration solution,
    wherein an amount of the surface active agent is more than or equal to 0.1 mass % and less than or equal to 30 mass % with respect to the total amount of the precious metal clay regeneration solution, and
    wherein the liquid paraffin is a chain saturated hydrocarbon having 20 or more carbon atoms.

2. A method for regenerating precious metal clay comprising a step of bringing a precious metal clay regeneration solution into contact with a solidified precious metal clay,
    wherein the precious metal clay regeneration solution includes water, a liquid paraffin, lower alcohols, and a surface active agent,
    wherein an amount of the liquid paraffin is more than or equal to 0.12 parts by mass and less than or equal to 60 parts by mass with respect to 100 parts by mass of the water,
    wherein an amount of the lower alcohols is more than or equal to 5 mass % and less than or equal to 50 mass % with respect to a total amount of the precious metal clay regeneration solution,
    wherein an amount of the surface active agent is more than or equal to 0.1 mass % and less than or equal to 30 mass % with respect to the total amount of the precious metal clay regeneration solution, and
    wherein the liquid paraffin is a chain saturated hydrocarbon having 20 or more carbon atoms.

* * * * *